United States Patent [19]
Irwin

[11] Patent Number: 6,010,424
[45] Date of Patent: Jan. 4, 2000

[54] TWO-PIECE LIMITED SLIP DIFFERENTIAL

[75] Inventor: Earl James Irwin, Fort Wayne, Ind.

[73] Assignee: Dana Corporation, Toledo, Ohio

[21] Appl. No.: 09/177,110

[22] Filed: Oct. 22, 1998

[51] Int. Cl.$^7$ .................................................. F16H 48/22
[52] U.S. Cl. ........................ 475/231; 475/235; 74/606 R
[58] Field of Search .................................. 475/230, 231, 475/234, 235, 237, 239, 240; 74/606 R

[56] References Cited

U.S. PATENT DOCUMENTS

| | | |
|---|---|---|
| 2,016,343 | 10/1935 | Oberem . |
| 2,510,996 | 6/1950 | Morgan ................................ 475/230 X |
| 2,808,740 | 10/1957 | Boden . |
| 2,932,218 | 4/1960 | Russell ..................................... 475/234 |
| 3,052,137 | 9/1962 | Russell ..................................... 475/234 |
| 3,457,807 | 7/1969 | Altmann ................................... 475/235 |
| 3,624,717 | 11/1971 | Brubaker . |
| 3,673,889 | 7/1972 | Hauser ..................................... 475/230 |
| 3,791,237 | 2/1974 | Kitano et al. ........................... 475/235 |
| 3,853,022 | 12/1974 | Duer . |
| 3,915,267 | 10/1975 | Shea ..................................... 475/230 X |
| 4,363,248 | 12/1982 | Brisabois . |
| 4,455,889 | 6/1984 | Hauser . |
| 4,864,890 | 9/1989 | Friedrich et al. . |
| 5,059,160 | 10/1991 | Raniero ................................ 475/231 X |
| 5,106,350 | 4/1992 | Beton . |
| 5,286,239 | 2/1994 | Ito et al. . |
| 5,620,388 | 4/1997 | Schlegelmann et al. . |
| 5,624,343 | 4/1997 | Krisher . |
| 5,655,418 | 8/1997 | Barnholt . |
| 5,718,653 | 2/1998 | Showalter ............................ 475/231 X |
| 5,938,558 | 8/1999 | Eybergen et al. ........................ 475/231 |

*Primary Examiner*—Charles A Marmor
*Assistant Examiner*—Ankur Parekh
*Attorney, Agent, or Firm*—Liniak, Berenato, Longacre & White

[57] ABSTRACT

This transmnission differential of the type comprising a two-piece differential case defined by a cup-shaped case member and a side member integrally formed with a ring gear to thereby increase the strength of the ring gear and case. The side member is bolted onto the cup-shaped case member. The pinion gears of this invention are not formed with a spherical portion at its interface with the case because the present invention provides a novel design that does not require the spherical radii because the two-piece case can easily be assembled with resort to these additional machining requirements. The pinion shaft is secured against rotation by a pin trapped in a bore formed in the case when the ring gear side member is mounted to the cup-shaped case member. Because the cup-shaped case member is formed with a flat mating surface, the present invention does not require eyebrows formed into the case for drilling points where the bolt is received in the case. The two-piece design also eliminates the need for windows in the case. Therefore, the present invention reduced manufacturing costs while providing a stronger differential case.

6 Claims, 6 Drawing Sheets

TWO-PIECE LIMITED SLIP DIFFERENTIAL

BACKGROUND OF THE INVENTION a) Field of the Invention

The present invention relates to a limited slip differential of the type used for driving the wheels of a road vehicle, whereby an improved design includes a two piece differential case, a ring gear incorporated into a case half and internal parts that can be assembled in a more economical and efficient manner b) Description of Related Art Conventional differentials utilized in vehicle drive trains typically include a face gear which is attached to the rotatable case and driven by a pinion gear attached to a vehicle drive shaft. Known differentials further include pinion mate gears rotatably supported on stub shafts or pins secured within a rotatable case, with the pinion mate gears meshing with bevel side gears splined to the axle shafts.

Conventional limited slip differentials suffer from drawbacks resulting from design deficiencies, including spherical radii at the case and pinion mating area in order to facilitate proper assembly, eyebrows cast into the case for drilling points, and the requirement for staking the locking pins in place. Conventional differentials also include a one-piece case with a ring gear bolted to the case, and windows in the side of the case to permit assembly of the pinions and side gears, friction discs and associated thrust washers.

Conventional limited slip differentials firer require clips to hold the non-rotating clutch plates in place during assembly of the clutch pack(s) and side gears.

The need exists for an improved limited slip differential design having a stronger case and an overall design that is easier to machine and assemble.

SUMMARY OF THE INVENTION

It is the specific object of the present invention to provide an improved two-piece limited slip differential case with a ring gear incorporated into a case half in a manner to provide ease of manufacture and assembly.

For this purpose, the transmission differential gear according to this invention, of the type broadly mentioned hereinabove, is characterized in that the case is a two-piece design whereby the ring gear is incorporated into one of the two halves of the case, and in that the lockpins engaging the pinion shaft are trapped in place when the ring gear half of the case is affixed to the other case half.

The present invention further eliminates the need for clips to hold the non-rotating clutch plates during assembly and the need for spherical radii at the area where the case and pinion engage one another. Such spherical radii are necessary in the conventional differential design in order to properly insert the pinion gears during the assembly process. This design deficiency is eliminated by the present inventive design Machine requirement are also eliminated by the invention. With the present invention, the eyebrows cast into the case for drilling points are eliminated along with the need for windows in the side of the differential case to permit assembly of the pinion and side gears as well as associated parts. These features reduce the machining steps required to manufacture the case and increase the strength of the case.

The differential of this invention is assembled one half at a time and then combined to thereby simplify the assembly process. First, clutch plates and clutch discs are fitted in place one at a time onto splines formed one sides gear, then the side gear carrying these clutch plates and discs are fitted into the cup-shaped case member whereby the tabs of the clutch plates engage the cover member in the same manner as with conventional differentals. The pinion gears and pinion shaft are then positioned within the cup-shaped case member with the pinon shaft being fixed in place by a roll pin. In the same manner, clutch plates and clutch discs are fitted in place one at a time onto splines of another side gear, then this side gear carrying these clutch plates and discs are fitted into the differential case side member whereby the tabs of the clutch plates engage the cover member in the same manner as with conventional differentials. The differential case side member with the side gear and the second clutch pack is then fixed to the cup-shaped case member and the bolts are applied to secure the two-piece case together. Pinion gears are provided on the pinion shaft.

Various form of embodiment of the present invention will now be described by way of illustration, not of limitations with reference to the attached drawings, in which the same reference numerals are used for designating similar or identical component elements throughout

DESCRIPTION OF THE PREFERRED EMBODIMENT

Figure 1:
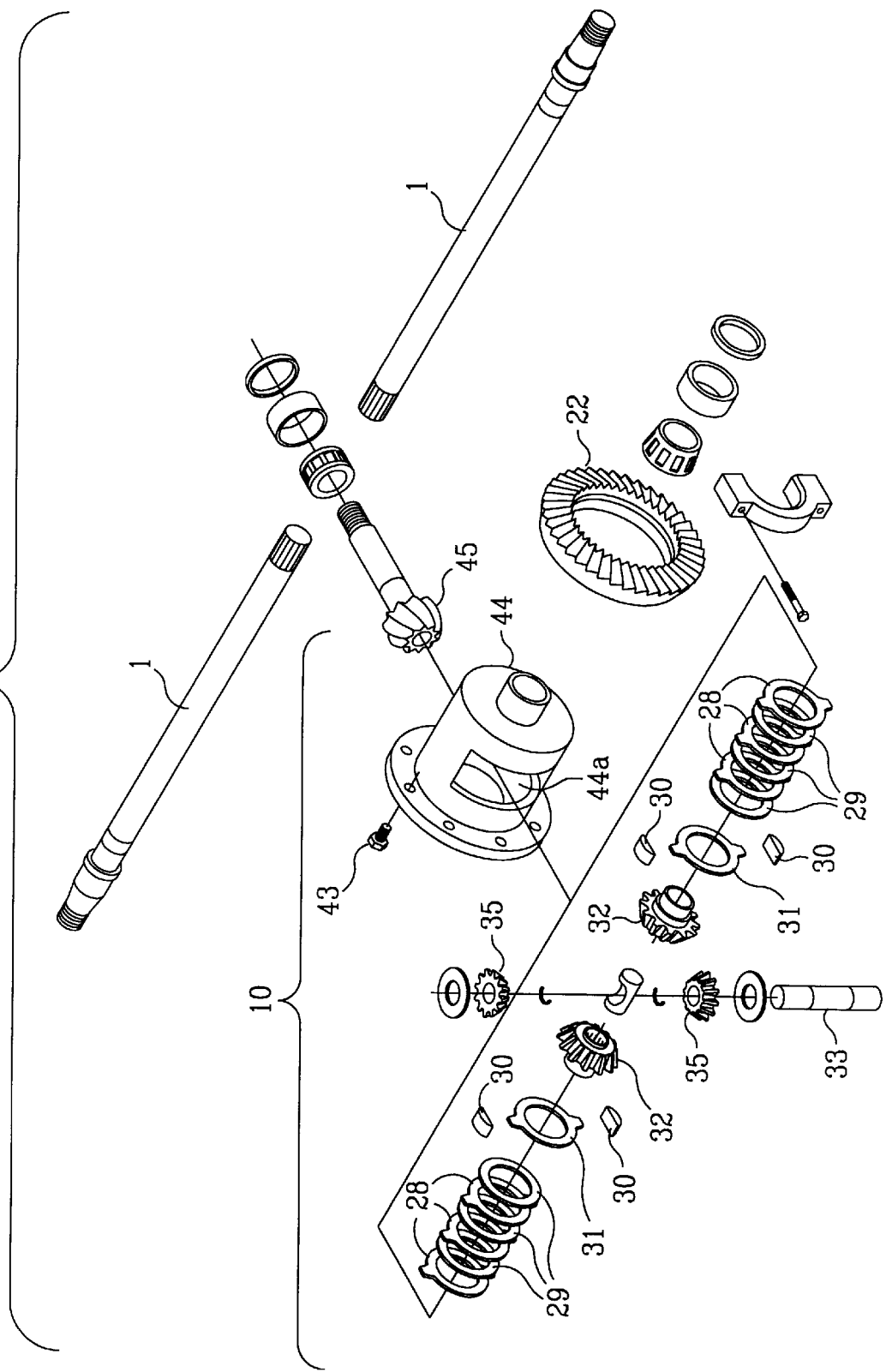
FIG. 1 is an exploded view of a conventional limited slip differential assembly with a complete rear axle assembly.

The complete rear axle assembly illustrated in FIG. 1 comprises a conventional limited slip differential 10 including a case 44 having windows 44a formed to receive the interior components of the differential 10. As shown, the pinion gear 45 that mates with the ring gear 22 fastened to the case 44 by a series of bolts 43.

During assembly of the convention differential, the clutch packs are splined to the side gears then tediously inserted into the casing through windows formed in the differential case. After the side gears and associated clutch packs are in place, the pinions gears are maneuvered into place and then the pinion shaft is inserted into the case 44 through the pinion gears.

The internal components of the differential 10 include the differential pinion gears 35 mounted on the differential pinion shaft 33 which is received in the differential case in a manner that will be described in detail below. The differential side gears 32 matingly engage the pinion gears 35 which are splined onto and drive the axles 1. Clutch plates 28 and clutch discs 29 are sequentially mounted within the case 44 such that the clutch discs 28 are fixed to the case by tabs, and the clutch plates 29 splined to the side gears 32.

For this conventional design, clutch retainer clips 30 are necessary to retain the clutch plates 28 and clutch discs 29 during the assembly process by engaging the tabs provided on the outermost clutch plate 28 and the spring 31. Without these retainer clips 30, the clutch packs would fall apart as the pinion gears were inserted into place. The springs 31, which are preferably Belleville, force the clutch plates 28 and clutch discs 29 together. As a result, both rear axles will tun with the differential case 44.

Figure 2:
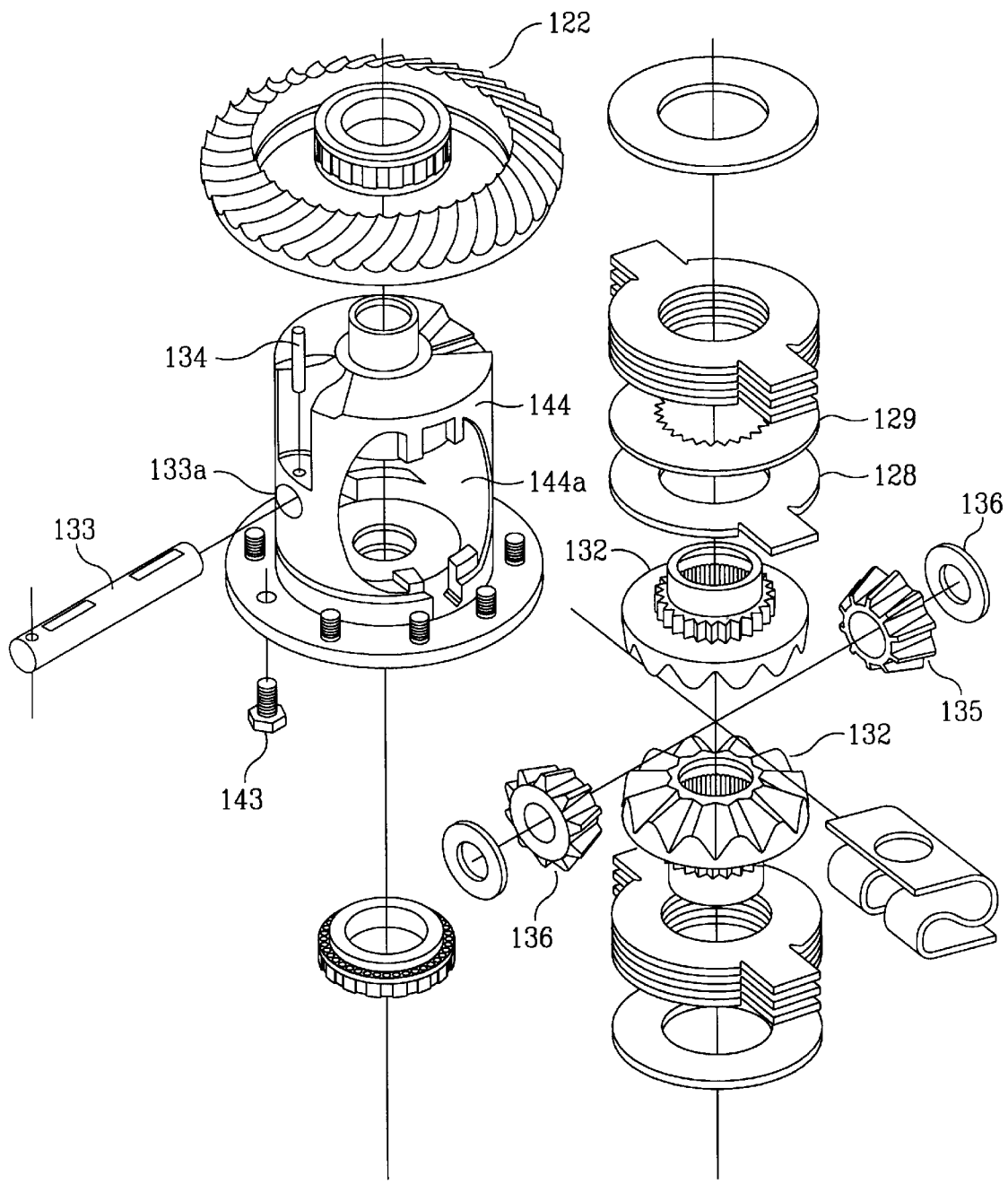
FIG. 2 is an exploded view of another conventional limited slip differential assembly.
Figure 3:
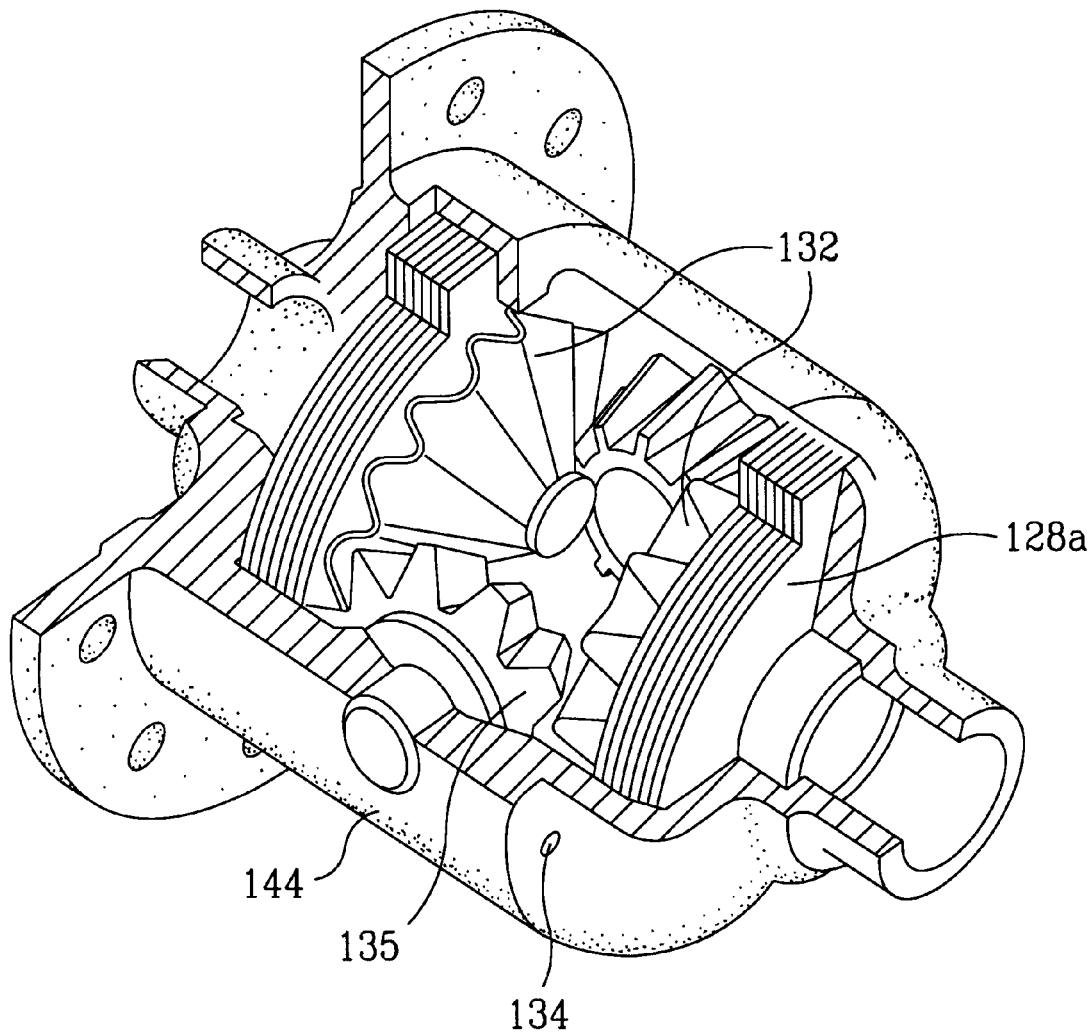
FIG. 3 is a perspective view in partial section showing the conventional limited slip differential assembly of FIG. 2 as assembled.

With reference to FIGS. 2 and 3, a conventional limited slip differential 110 is illustrated included a ring gear 122 that is bolted to the differential case 144 by a series of bolts 143. The pinion shaft 133 passes into the differential case via aperture 133a and through the pinion gears 135 and thrust washers 136 to thereby retain the pinion gears within the case 144. The pinion shaft 133 is retained in place by a roll pin 134 that is staked in place.

Like the differenial of FIG. 1, clutch plates 128 are alternately interposed between clutch discs 129 whereby the clutch plates 128 are fixed to the case via tabs 128a and clutch discs 129 are splined onto the splined side gears 132.

As shown in FIG. 2, the differential case 144 requires windows 144a formed in the one-piece differential case in order to insert and assemble the working parts into the case 144.

Figure 4:
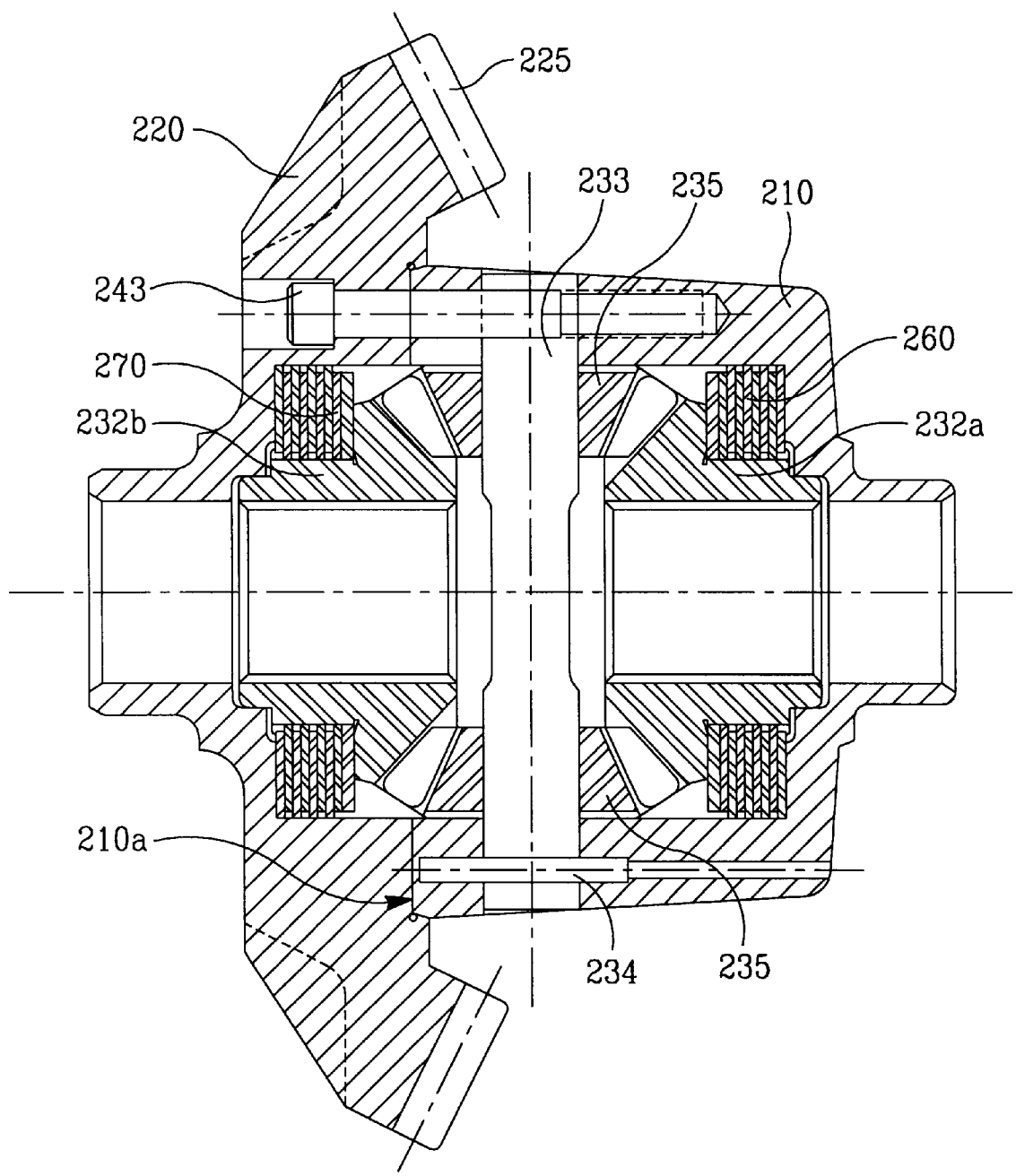
FIG. 4 is a sectional view of the limited slip differential according to one embodiment of this invention.

With reference to FIG. 4, the design of the present invention will now be discussed in detail The differential 200 of the present invention comprises a two-piece differential case defined by the cup-shaped case member 210 and the side case member 220. The side case member 220 is integrally formed with a ring gear 225, and this integrally formed ring gear case half increases the strength of the ring gear 225. After the internal component are properly fitted into place, the side member 220 is bolted onto the cup-shaped member 210 by a series of eight bolts 243. It is noted that the prior art design tat incorporates a separate ring gear (see FIGS. 1–3) required ten bolts while the present invention only requires eight bolts 243, and the reduced number of bolts consequently saves manufacturing costs.

Figure 5A:
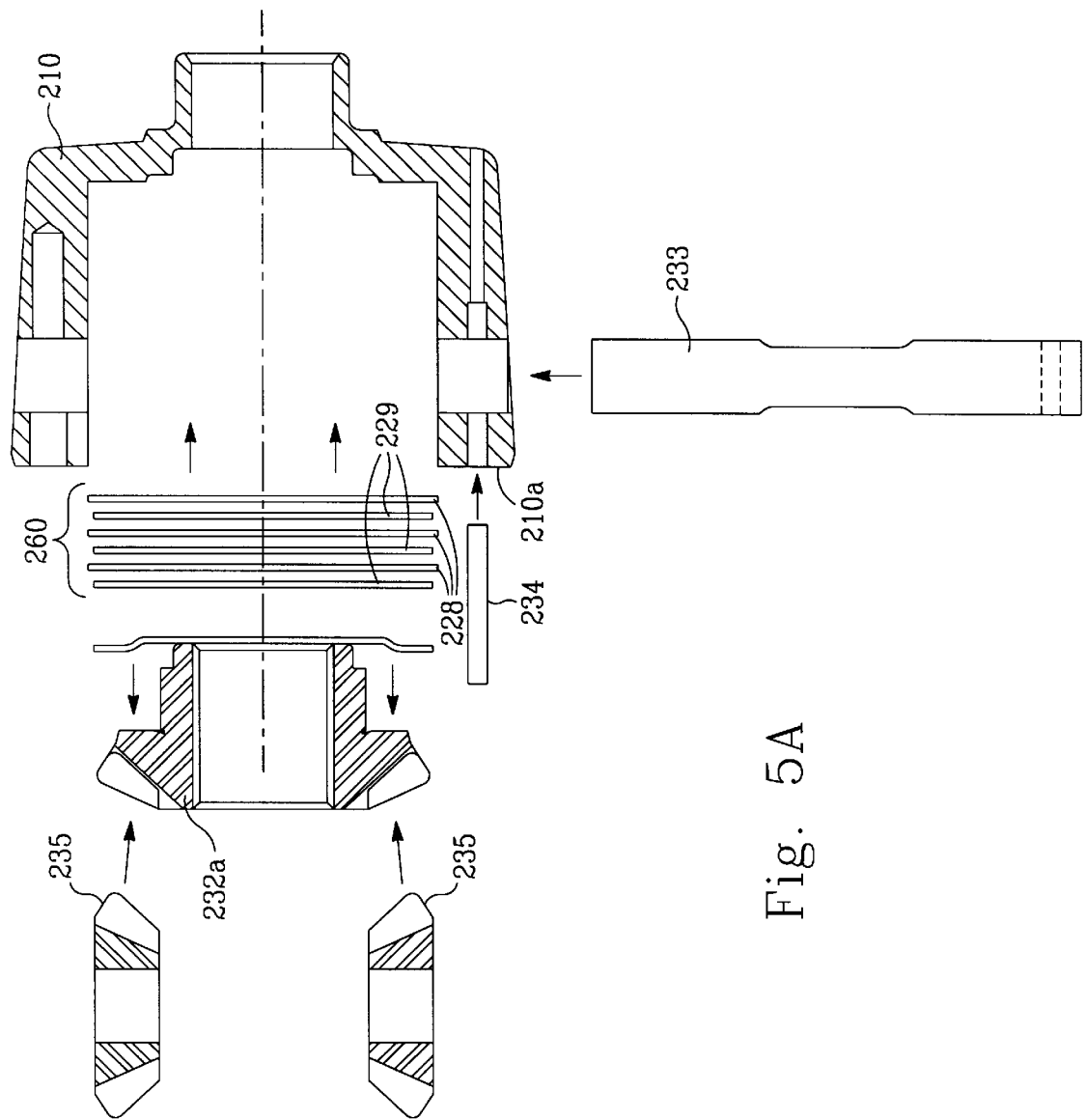
FIGS. 5a and 5b are exploded view of the two case halves of this invention as well as the parts assembled in each case half prior to combining the two halves.
Figure 5B:
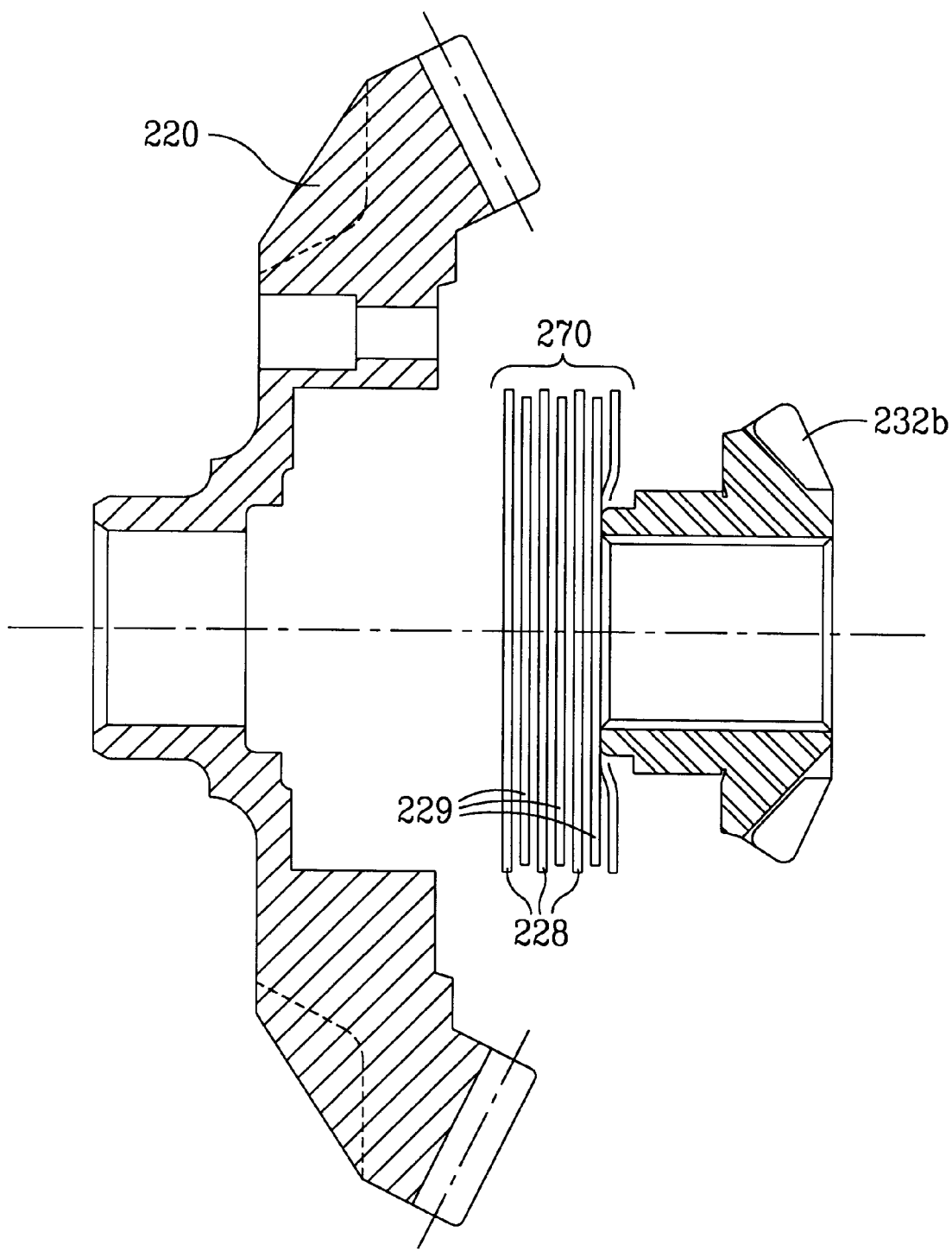

With reference to FIGS. 5a and 5b, the differential of this invention is assembled one half at a time. First and as shown in FIG. 5a, the clutch plates 228 and clutch discs 229 are fitted in place one at a time onto splines formed on the side gear 232a, then that side gear 232a carrying these clutch plates and discs are fitted into the cup-shaped case member 210 whereby the tabs of the clutch plates engage the cover member 210 in the same manner as the conventional differential of FIGS. 1–3. The pinion gears 235 and pinion shaft 233 are then positioned within the cup-shaped member 210 with the pinion shaft 233 being fixed in place by a roll pin 234 that is staked in place.

In the same manner, the clutch plates 228 and clutch discs 229 are fitted in place one at a time onto splines of the side gear 232b, then this side gear 232b is fitted into the differential case side member 220 whereby the tabs of the clutch plates engage the cover member 210 in the same manner as the conventional differental The differential case side member 220 with the side gear 232b and the second clutch pack 270 is then fitted with the cup-shaped case member 210 and the bolts 243 are then applied to secure the two-piece case 210, 220 together.

Pinion gears 235 are provided on the pinion shaft 233. Significantly, the pinion gears of this invention are not formed with a spherical portion at its interface with the case 210. In the prior art, the pinion gears are formed with a spherical portion that interfaces with a spherical recess formed in the case in order to enable proper assembly of the differential. In the present invention, a planar surface on each of the pinion gears faces an inner planar surface 211 on the cup-shaped case member 210. The present invention provides a novel design that does not require the spherical radii because the two-piece case can easily be assembled without resort to these additional machining steps.

The pinion shaft 233 is secured against rotation by a roll pin 234 trapped in a bore formed in the case when the ring gear side member 220 is mounted to the cup-shaped case member 210. This design thus eliminates the staking step present in the prior art whereby the pinion shaft was secured by means of a toll pin (see roll pin 134 of FIG. 2). Moreover, because the cup-shaped case member 210 is formed with a flat mating surface 210a, the present invention does not require eyebrows formed into the case for drilling points, i.e., as shown in FIG. 2 where the pin is received in the case 144. Therefore, the present invention reduced manufacturing costs while providing a stronger differential case.

The present invention provides a differential that is easier to machine/manufacture and assemble when compared to conventional differential.

As evident from the foregoing description, the differential according to this invention is characterized in that the case is a two-piece design whereby the ring gear is incorporated into one of the two halves of the case, and in that the lockpins engaging the pinion shaft are trapped in place when the ring gear half of the case is affixed to the other case half. The design of this invention reduces the machining steps necessary to product the case while at the same time providing a stronger case design.

The present invention further eliminates the need for claps to hold the non-rotating clutch plates during assembly. Moreover, the present invention eliminates the need for the spherical radii, that are necessary in the conventional differential design, at the area where the case and pinion engage one another.

With the present invention, the eyebrows cast into the case for drilling points (see FIG. 2) are also eliminated. Significantly, the present invention eliminates the need for windows in the side of the differential case to permit assembly of the pinion and side gears as well as associated parts because the parts are assembled through the open end of the cup-shaped case member 210. These features reduce the machining steps required to manufacture the case and increase the strength of the case.

While the present invention has been shown and described with reference to a specific embodiment, it will be understood by those possessing skill in the art that various changes is form and detail may be made therein without departing from the spirit and scope of the present invention.

I claim:

1. A differential, comprising:
   a differential case defined by a cup-shaped case member having an open end defined by a peripheral mating surface, and a cover case member integrally formed with a ring gear;
   a pinion shaft mounted on said cup-shaped case member, said pinion shaft being received in and extending between two opposite apertures formed in sidewalls of said cup-shaped case member, wherein said two opposite apertures are remote from said cover case;
   a pair of pinion gears mounted on said pinion shaft;
   a first side gear matingly engaging said pair of pinion gears and disposed within said cup-shaped case member;
   a first clutch means for limiting relative rotation between said first side gear and said cup-shaped case member;
   a second side gear matingly engaging said pair of pinion gears and disposed within said cover case member; and a second clutch means for limiting relative rotation between said second side gear and said cover case member.

2. The differential of claim 1, wherein said cover member being fixed to said cup-shaped case member at said peripheral mating surface.

3. The differential of claim 1, wherein each of said pinion gears comprising a planar surface facing an inner planar surface of said cups-shaped case member.

4. The differential of claim 1, further comprising a tapered bore hole formed through said peripheral mating surface and into a wall of said cup-shaped case member and a pin member inserted into said bore hole and through said pinion shaft, wherein said pin member is trapped within said tapered bore hole at one end by said case cover member and at an opposite end by a reducing diameter of said tapered bore hole to prevent movement of said pinion shaft.

5. The differential of claim 1, wherein said first clutch means comprises at least one clutch plate fixed to said cup-shaped case member and at least one clutch disc fixed to said first side gear via splines.

6. The differential of claim 1, wherein said second clutch means comprising at least one clutch plate fixed to said cover case member and at least one clutch disc fixed to said second side gear via splines.

* * * * *